(12) United States Patent
Park et al.

(10) Patent No.: US 8,142,526 B2
(45) Date of Patent: Mar. 27, 2012

(54) ARTIFICIAL FIRE LOG

(75) Inventors: David W. Park, Puyallup, WA (US); Amar N. Neogi, Kenmore, WA (US); Ludwig Furtner, Jr., Tacoma, WA (US)

(73) Assignee: Weyerhaeuser NR Company, Federal Way, WA (US)

( * ) Notice: Subject to any disclaimer, the term of this patent is extended or adjusted under 35 U.S.C. 154(b) by 346 days.

(21) Appl. No.: 12/551,301

(22) Filed: Aug. 31, 2009

(65) Prior Publication Data

US 2011/0047865 A1    Mar. 3, 2011

(51) Int. Cl.
*C10L 11/00* (2006.01)
(52) U.S. Cl. ............... 44/535; 44/551; 44/578; 44/589; 44/590; 44/605; 44/606
(58) Field of Classification Search .............. 44/535, 44/551, 578, 589, 590, 605, 606
See application file for complete search history.

(56) References Cited

U.S. PATENT DOCUMENTS

| | | | |
|---|---|---|---|
| 3,297,419 A | 1/1967 | Eyre, Jr. | |
| 3,843,336 A | 10/1974 | Messman | |
| 4,040,796 A | 8/1977 | Vincent | |
| 4,104,034 A | 8/1978 | Yengtsu | |
| 4,326,854 A | 4/1982 | Tanner | |
| 4,333,738 A | 6/1982 | Schrader | |
| 5,858,032 A | 1/1999 | Hardy | |
| 5,858,036 A | 1/1999 | Chandaria | |
| 5,868,804 A | 2/1999 | Williams | |
| 6,017,373 A | 1/2000 | Frisch | |
| 6,132,481 A | 10/2000 | Chandaria | |
| 6,136,054 A | 10/2000 | Tutupalli | |
| 6,196,215 B1 | 3/2001 | Chandaria | |
| 6,245,119 B1 | 6/2001 | Chandaria | |
| 6,602,306 B2 | 8/2003 | Scott | |
| 6,660,051 B2 | 12/2003 | Chandaria | |
| 6,666,900 B2 | 12/2003 | Chandaria | |
| 6,719,816 B2 | 4/2004 | Barford | |
| 2002/0194779 A1 | 12/2002 | Barford | |
| 2003/0009929 A1* | 1/2003 | Newton et al. | 44/275 |
| 2008/0196301 A1 | 8/2008 | de Oliveira | |
| 2008/0196302 A1 | 8/2008 | Cavero | |

* cited by examiner

*Primary Examiner* — Cephia D Toomer
(74) *Attorney, Agent, or Firm* — John M. Crawford

(57) ABSTRACT

Artificial fire logs made from non-petrochemical based, renewable materials are described. These artificial fire logs perform substantially equivalent to existing commercial fire logs. The artificial fire logs are made from cellulosic materials, a lignin containing composition and a non-petroleum based wax where the lignin containing composition comprises lignin and 1,3-propanediol derived from a renewable resource.

12 Claims, No Drawings

ARTIFICIAL FIRE LOG

TECHNICAL FIELD

The present application generally relates to an artificial fire log made from non-petrochemical based, renewable materials that performs substantially equivalent to an existing commercial fire log.

BACKGROUND

Fireplaces have been used in homes over the years for providing heat as well as to provide a desired ambience. While firewood has been the primary fuel for burning in fireplaces, there is an increasing demand for artificial fire logs. These logs are easier to purchase and store, provide better Btu/lb value than wood, are easier to light, safer to use with virtually no maintenance during burning, and can be used to build fires of a known duration.

Various types of artificial fire logs are known and have been formulated to act as a substitute for natural firewood and are designed for use in fireplaces. Typically, artificial fire logs are made by mixing a material, usually particles of cellulosic origin, with a combustible binder. Wood particles and other cellulosic-containing materials are often used as the material. Various types of inexpensive waxes and related petroleum derived products are commonly used as the binders for the particles in the artificial fire logs. The binder functions to hold the fire log in a desired shape and aids in the combustion process, since it commonly provides a significant portion of the fire log's fuel value during the combustion of the fire log in a fireplace or other suitable combustion location.

Generally, artificial fire logs are formed by extruding the mixture through a bore extrusion die wherein the material and binder as well as any other materials incorporated therein are molded or extruded into an elongated form that resembles a piece of natural wood. The extruded product is cut into predetermined lengths that are sized to fit in a home fireplace and provide a predictable burn time. The elongated flammable bodies (also know as artificial fire logs) formed by this process are usually placed in a protective outer wrapper or sheath for sale, although this is optional and depends on the aesthetics of merchandizing and sale and the materials selected to form the artificial fire logs.

These artificial fire logs are typically marketed for sale to residential homeowners for use in a home fireplace to provide heat and an attractive fire that simulates the fire produced by a natural wood fire. In order to provide advantages over a natural wood fire, the artificial fire logs are formulated so that they can burn for a few hours without attending to the fire as would be required when burning natural wood. Also, artificial fire logs generally start much easier, burn cleaner and generate less ash compared to natural wood. In order to make the use of the artificial fuel log more attractive than use of natural wood, the fire log usually includes means for rapidly igniting it with a match which is applied to the outer wrapper. Further, since the artificial fire log is in many instances being used for the aesthetic enjoyment of a fire in social settings, any attributes that are similar to a traditional wood fire will enhance the pleasure of the products use and more closely simulate a traditional wood fire.

While existing artificial fire log can perform substantially as expected, there is now a growing demand for artificial fire logs that are made from non-petrochemical based materials that are renewable and yet perform substantially equivalent to an existing commercial fire log.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, the embodiments described herein relate to an artificial fire log made from a cellulosic material and a lignin containing composition, where the lignin containing composition comprises lignin and 1,3-propanediol derived from a renewable resource.

Another aspect of the embodiments described herein relates to an artificial fire log made from a cellulosic material, a lignin containing composition, where the lignin containing composition comprises lignin and 1,3-propanediol derived from a renewable resource and with a flame height additive, such as tall oil.

DETAILED DESCRIPTION

Artificial fire logs in accordance with the present invention may be made from a broad range of cellulosic materials. Typical cellulosic materials include wood particles, pulp, shavings or chips, sawdust, ground bark, shredded paper or cardboard, sphagnum moss, and agricultural waste materials such as straw, fruit pits, bagasse, grass clippings, leaves, cotton linter, rice hulls, peanut or other nut shells, coffee grounds and other cellulosic materials that are flammable and are derived from renewable materials.

Similarly, the artificial fire logs in accordance with the present invention may be made from a broad range of lignin. Lignin is found in the cell walls of vascular plants and in the woody stems of hardwoods and softwoods. Along with cellulose and hemicellulose, lignin forms the major components of the cell wall of these vascular plants and woods. Lignin acts as a matrix material that binds the plant polysaccharides, microfibrils, and fibers, thereby imparting strength and rigidity to the plant stem. Total lignin content can vary from plant to plant. For example, in hardwoods and softwoods, lignin content can range from about 15% to about 40%. Wood pulping is one process for recovering lignin and is one of the largest industries in the world. Various types of wood pulping processes exist, including Kraft pulping, sulfite pulping, soda pulping, and organosolv pulping. Each of these processes results in large amounts of lignin being extracted from the wood. The extracted lignin has generally been considered to be waste and traditionally was either burned to recover energy or otherwise disposed of. Only a small amount of lignin is recovered and processed to make other products. Efforts are now underway to utilize this lignin, motivated by its widespread availability and the renewable nature of its source. In addition, the biodegradability of lignin makes it attractive from a "green" perspective. In addition to the lignin derived from hardwood and softwood trees lignin can also be derived from energy crops (such as switchgrass, miscanthus, prairie cordgrass, and native reed canary grass to name but a few) and agriculture waste (such as corn stover, corn residue, corn husk, sugar cane bagasse, castor oil plant, rapeseed plant, soybean plant, cereal straw, grain processing by-products, bamboo, bamboo pulp, bamboo sawdust, rice straw, paper sludge, waste papers, recycled papers, and recycled pulp to name but a few).

The lignin is often obtained in the form of a light to dark brown or reddish mass which may be granulated upon drying. To be useful in the present invention the lignin composition must have a low melting point when in the dry state, correlated to the conditions to which it will be subjected to as part of the molding or extruding operations to make the artificial fire log. Lignin readily obtainable from hardwood or softwood pulping operations has been found to exhibit no measureable melting point, but rather upon exposure to elevated temperatures in the 120-160° C. range undergoes thermo-decomposition.

In accordance with the present invention it has now been found that the addition of 1,3-propanediol from a renewable resource such as corn acts as a melting point modifying agent for the lignin composition. One source of such 1,3-propanediol is E.I. duPont.

Non-petroleum based waxes such as vegetable wax from soy bean will continue to be included in the final composition. Other additives may include chemicals designed to color or otherwise modify or retard the flame, add aroma or change the burning characteristics of the artificial fire log to more closely mimic the burning of natural logs, as well as various kinds of natural seeds and/or particulate byproducts for simulating the crackling sounds produced by a burning natural log. A broad range of known fire log cross sectional shapes may also be employed. For example, one or more longitudinally extending grooves may be provided to accelerate ignition. Still further, as is well known, the artificial fire logs may be enveloped in outer wrappers for protecting the fire log and facilitating its ignition. Artificial fire logs in accordance with the present invention may make use of the materials, configurations and other attributes summarized above; the foregoing list is not intended to limit the composition, configuration, or other attributes of flammable artificial fire logs described and claimed herein.

One fire log additive that warrants specifically calling out is a flame enhancer which increases the height of the flame generated by the artificial fire log. In particular, the use of tall oil or vegetable wax such as those derived from soy beans in the artificial fire log composition of the present invention has been found to enhance the height of the flame and thereby improve the aesthetic appearance of the burning fire log.

An artificial fire log pursuant to the invention comprises about 40 to 60 weight percent of cellulosic material; and about 5 to 25 weight percent of the lignin containing composition and about 15 to 40 weight percent of a non-petroleum based wax. Preferably, the artificial fire log pursuant to the invention comprises about 45 to 55 weight percent of cellulosic material; and about 15 to 25 weight percent of the lignin containing composition and about 25 to 35 weight percent of a non-petroleum based wax. Most preferably, the artificial fire log pursuant to the invention comprises about 50 weight percent of cellulosic material; and about 20 weight percent of the lignin containing composition and about 30 weight percent of a non-petroleum based wax.

The lignin containing composition itself is made by first mixing and then heating a blend of lignin and 1,3-propanediol from a renewable resource in the amount to obtain the final lignin composition. The proportion of lignin to 1,3-propanediol of ranges from about 50 to 90 weight percent of lignin and about 10 to 50 weight percent 1,3-propanediol and preferably from about 85 weight percent of lignin and about 15 weight percent 1,3-propanediol.

Whereas the exact scope of the instant invention is set forth in the claims, the following specific examples illustrate certain aspects of the present invention and, more particularly, point out methods of evaluating the same. However, the examples are set forth for illustration only and are not to be construed as limitations on the present invention except as set forth in the claims. All parts and percentages are by weight unless otherwise specified.

EXAMPLES

1. Differential Scanning Calorimeter (DSC) Analysis

Description of instrument and analysis: Glass transitions were measured on a TA Instrument Q200 Differential Scanning Calorimeter (DSC) using Aluminum Tzero Hermetic Pans. The method involved cooling the samples at 10° C./minute from room temperature to −75° C., heating at 20° C./min to 160° C., cooling at 10° C./minute to −75° C., and a final heat at 20° C./minute to 170° C. The first glass transition was considered of most importance but glass transitions were also observed in the final heat cycle.

Sample preparation: 10-gram samples were prepared by weighing out 2.5 grams of modifying agent and 7.5 grams of a softwood Kraft lignin from Backhammer ("SWKL") in aluminum weigh boats. The samples are next placed on a hot plate, and gradually heated, while mixing the samples. At the point of a phase change in two or more of the mixed materials into a uniform, viscous liquid occurs, the temperature is noted and the samples are mixed until homogeneous. The modifying agents evaluated were polyethylene glycol (PEG) 200 from Dow Chemical; glycerin from Aldrich; and 1,3-propanediol (PDO) derived from corn from Interstate Chemical.

Sample testing: The samples, typically received in re-sealable plastic bags, are friable black solids. 10 to 15 milligram subsamples will be weighed into hermetically sealable Tzero aluminum pans. The instrument available is the TA Instruments DSC Q200. The temperature program will run from −75° C. to a maximum of 165° C. The DSC sample cell will be purged with pre-pure nitrogen during the run. The first heating curve will be inspected for potential transitions, including melting and glass transitions.

DSC Results: Several sample combinations were evaluated. Typically, three specimens were measured per experiment. Table 1 represents an average value of the results obtained.

TABLE 1

| DSC Test Results | | |
|---|---|---|
| Formula | Melting Point | Observations |
| 75% SWKL/25% PEG 200 | 162° C. | Evidence of decomposition at 159° C. |
| 75% SWKL/25% Glycerin | 122° C. | Evidence of smoke during sample preparation |
| 75% SWKL/25% PDO | 47.66° C. | No smoke or decomposition |
| 85% SWKL/15% PDO | 52.23° C. | No smoke or decomposition |

2. Fire Log Preparation and Testing

The resins were prepared by weighing out the lignin and modifying agents at predetermined ratios, as outlined in Table 1. These samples were then heated in a VWR 1330 Forced Air Oven at 85° C. for five minutes. The samples were removed, stirred and placed back in the oven. This was repeated. After fifteen minutes the samples were homogeneous, and were allowed to cool.

The samples were next fed through an electric granulator (Intelli-Torque Model IT 7150) until they were reduced to small granules. These granules were then ground to a fine powder with an electric Mortar-Pestle (Torsion Balance Co., Model MG 2). Commercially available artificial fire logs such as Duraflame® or Pine Mountain® brands were obtained from The Home Depot and other retailers in Federal Way, Wash. The fire log wrappers were removed and the logs were ground in a Henchel Mixer (Type FM 100) to form material that would represent actual fire log composition.

Rather than attempt to duplicate the formulas used by the artificial fire log manufacturer's since these formulas vary seasonally depending on the availability of cellulosic materials, it was decided to replace different percentages of the ground log material with the previously described sample formulations. To complete the material preparation, the powdered resins were combined with the ground fire log material in a large plastic bag and shaken until uniform.

A log mold was designed that would enable the production of artificial fire logs. Commercial fire log densities typically run 0.995 grams/cm$^3$ as determined by water displacement. Rather than preparing the standard 12' long×4' diameter commercial fire log configuration, it was determined that a 3' long×3' diameter mold would provide the most efficient size for testing in a short period of time. This mold was designed by Weyerhaeuser R&D and fabricated by the Weyerhaeuser Technology Center Machine Shop (Federal Way, Wash.). The top of the mold was used as a plunger to pack the material in to the mold in 25% weight increments so as to obtain a substantially uniform density log with a density analogous to that found in a commercial log.

A 3' section of an actual purchased Duraflame log was sawn off to represent an extruded control.

The formulas prepared for fire log molding and burn testing were as follows:

A. A 3" section of an actual purchased Duraflame log was sawn off to represent an extruded control (designated as Control 1).
B. A 3" section of an actual purchased Duraflame log was sawn off and ground up and molded as set forth above (designated as Control 2).
C. A 3" section of an actual purchased Duraflame log was sawn off and ground up and 10 weight percent was removed and replaced with a lignin composition of 25% PEG 200/75% SWKL+10% tall oil (from Arizona Chemicals) and the resulting mixture was molded as set forth above (designated as Material 1).
D. A 3" section of an actual purchased Duraflame log was sawn off and ground up and 25 weight percent was removed and replaced with a lignin composition of 25% PEG 200/75% SWKL+10% tall oil and the resulting mixture was molded as set forth above (designated as Material 2).
E. A 3" section of an actual purchased Duraflame log was sawn off and ground up and 10 weight percent was removed and replaced with a lignin composition of 15% 1,3 Propanediol/85% SWKL+10% tall oil and the resulting mixture was molded as set forth above (designated as Material 3).

The formulas were prepared, weighed, and added to the mold at designated densities and placed in the oven at 80° C. for two hours. The molds were then cooled overnight and the samples were removed for burn testing. A groove was added to the mold to provide an air train to sustain burning, similar to actual extruded Duraflame logs.

The BTU/lb values were determined by following ASTM D 5865; % Sulfur was determined by following ASTM D 1552; % Ash was determined by following ASTM D 3174; and Ash pH was determined by preparing a slurry of the recovered ash and distilled water and the pH read pursuant to USGS I-1586. Results are listed in Table 2.

TABLE 2

| Material | BTU's/lb | % Sulfur | % Ash | Ash pH |
|---|---|---|---|---|
| 1. Control 1 | 12,293 | 0.085 | 1.34 | 10.90 |
| 2. Control 2 | 12,400 | 0.081 | 1.22 | 10.87 |
| 3. Material 1, 10% substitution | 12,093 | 0.205 | 1.32 | 11.00 |
| 4. Material 2, 25% substitution | 12,580 | 0.379 | 1.46 | 10.91 |
| 5. Material 3, 10% substitution | 12,570 | 0.263 | 1.23 | 11.73 |

3. Burn Tests

After confirming the samples were within the property ranges of the control materials, the molded logs were placed in a Duraflame wrapper (wick) and burned under observation, along with control Duraflame logs in a UniFlame Outdoor Firebowl (fireplace), Model WAF501CS, shielded on three sides. The burn times were measured using a stopwatch; the flame height was measured using a ruler; and percent unburned materials were estimated by visual observation. A minimum of three logs per condition were tested. The burn tests/observations are summarized in Table 3, averaged 3 tests per condition:

TABLE 3

Burn Test Results

| Material | Burn Time (min) | Flame height, 15 min | % Unburned Ember |
|---|---|---|---|
| 1. Control 1 | 56.0 | 6-8' | 30-40 |
| 2. Control 2 | 60.8 | 6' | 30-40 |
| 3. Material 1, 10% substitution | 62.3 | 6' | 30-40 |
| 4. Material 2, 25% substitution | 58.7 | 4' | 50-60 |
| 5. Material 3, 10% substitution | 60.0 | 6' | 30-40 |

4. Adhesion Tests

To better understand the effectiveness of the lignin composition to function in artificial fire log, samples were prepared to measure the adhesive properties of these materials against traditional wax binders. For this study, the following formulas were selected:

A. Soy bean wax from Marcus Oil and Chemical (designated as Material 4).
B. 15 parts by weight of 1,3 propanediol; 85 parts by weight of SWKL; and 10 parts by weight of tall oil (designated as Material 5).
C. A blend of 80 parts by weight of the soy bean wax and 20 parts by weight of the composition of 15 parts by weight of 1,3 propanediol; 85 parts by weight of SWKL; and 10 parts by weight of tall oil (designated as Material 6).

Next, 12 cm×2 cm Aspen tensile tests strips were received from Certainlywood Co., NY, NY. The strips were conditioned at 20° C./50% relative humidity for 24 hours and prepared as follows:

An area of 6 cm×2 cm was measured on the strips and 0.50 grams of each formula was uniformly covered over the area. A second strip was placed over the covered area, allowing a 5 cm area on each end for the tensile tester clamps. The tensile tester for this study was the INSTRON 4400R. The test method was ASTM D 2339-98, 2-Ply Wood Shear. The samples were then placed on caul-plates and inserted into a GIVEN P-H-I 1'×1' press. The platens were heated to 85° C. for the pressing studies. The press was then closed to zero daylight, approximately 500 psi. The samples were held for 54 minutes as the platens were cooled to <70° C. to allow the formulas to solidify. Pressed samples were removed and re-conditioned at 20° C./50% relative humidity for 24 hours. Three samples per formula were prepared. Each specimen was then mounted in the tensile tester and the test strips were pulled, using ASTM Test D 2339-98. Results are reported in Table 4, as follows:

TABLE 4

| Condition | Tensile at Max Load | Elongation % | *TEA (J/m$^2$) |
|---|---|---|---|
| Material 4 | 7.46 | 0.41 | 12.56 |
| Material 5 | 27.03 | 1.28 | 182.4 |
| Material 6 | 19.03 | 0.85 | 71.80 |

5. DSC and BTU Tests

The following additional ratios of SWKL/JPDO were prepared and ran on the DSC to determine melting point, glass transition ($T_G$) and BTUs. The results are set forth in Table 5 below.

TABLE 5

| Condition | BTU/lb | Melting Point |
|---|---|---|
| 15% PDO 85% SWKL | 11,630 | 50.71° C. |
| 25% PDO 75% SWKL | 11,570 | 47.66° C. |
| 35% PDO 65% SWKL | 11,320 | 39.92° C. |
| 50% PDO 50% SWKL | 11,090 | 50.41° C. |
| 15% PDO 85% SWKL with 10% Tall Oil add. | 11,770 | 77.29° C. |

While illustrative embodiments have been illustrated and described, it will be appreciated that various changes can be made therein without departing from the spirit and scope of the claimed subject matter.

The invention claimed is:

1. An artificial fire log comprising a mixture of (a) from about 40 to 60 weight percent of a cellulosic material; (b) from about 5 to 25 weight percent of a lignin containing composition; and (c) from about 15 to 40 weight percent of a non-petroleum based wax, wherein the lignin containing composition comprises from about 50 to 90 weight percent lignin and from about 10 to 50 weight percent 1,3-propanediol wherein the 1,3-propanediol is derived from a renewable source.

2. The artificial fire log of claim 1, wherein the amount of cellulosic material is from about 45 to 55 weight percent.

3. The artificial fire log of claim 1, wherein the amount of the non-petroleum based wax is from about 25 to 35 weight percent.

4. The artificial fire log of claim 1, wherein the amount of the lignin containing composition is from about 15 to 25 weight percent.

5. The artificial fire log of claim 4, wherein lignin containing composition comprises from about 85 weight percent lignin and from about 15 weight percent 1,3-propanediol wherein the 1,3-propanediol is derived from a renewable source.

6. The artificial fire log of claim 1, wherein there is added an effective sum of tall oil for flame enhancement.

7. The artificial fire log of claim 4, wherein there is added an effective amount of tall oil to enhance for flame enhancement.

8. The artificial fire log of claim 5, wherein there is added an effective amount of tall oil for flame enhancement.

9. An artificial fire log comprising a mixture of (a) from about 45 to 65 weight percent of a cellulosic material; (b) from about 15 to 25 weight percent of a lignin containing composition; and (c) from about 25 to 35 weight percent of a non-petroleum based wax, wherein the lignin containing composition comprises from about 50 to 90 weight percent lignin and from about 10 to 50 weight percent 1,3-propanediol wherein the 1,3-propanediol is derived from a renewable source.

10. The artificial fire log of claim 9, wherein there is added an effective amount of tall oil for flame enhancement.

11. An artificial fire log comprising a mixture of (a) from about 50 weight percent of a cellulosic material; (b) from about 20 weight percent of a lignin containing composition; and (c) from about 30 weight percent of a non-petroleum based wax, wherein the lignin containing composition comprises from about 85 weight percent lignin and from about 15 weight percent 1,3-propanediol wherein the 1,3-propanediol is derived from a renewable source.

12. The artificial fire log of claim 11, wherein there is added an effective amount of tall oil for flame enhancement.

* * * * *